(12) United States Patent
Chakra et al.

(10) Patent No.: US 11,086,878 B2
(45) Date of Patent: *Aug. 10, 2021

(54) PROVIDING CONTEXT IN ACTIVITY STREAMS

(71) Applicant: International Business Machines Corporation, Armonk, NY (US)

(72) Inventors: Al Chakra, Apex, NC (US); Liam Harpur, Skerries (IE); John Rice, Waterford (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 16/184,253

(22) Filed: Nov. 8, 2018

(65) Prior Publication Data

US 2019/0073400 A1 Mar. 7, 2019

Related U.S. Application Data

(63) Continuation of application No. 14/640,374, filed on Mar. 6, 2015, now Pat. No. 10,380,116, which is a continuation of application No. 14/446,785, filed on Jul. 30, 2014.

(51) Int. Cl.
*G06F 16/2455* (2019.01)
*G06F 16/951* (2019.01)

(52) U.S. Cl.
CPC ...... *G06F 16/24568* (2019.01); *G06F 16/951* (2019.01)

(58) Field of Classification Search
CPC .................. G06F 16/24568; G06F 16/951
USPC ................................................ 707/770
See application file for complete search history.

(56) References Cited

U.S. PATENT DOCUMENTS

| | | | |
|---|---|---|---|
| 2005/0283800 A1 | 12/2005 | Ellis | |
| 2008/0005736 A1* | 1/2008 | Apacible | G06N 20/00 718/100 |
| 2008/0084977 A1* | 4/2008 | Nayak | H04M 15/00 379/130 |
| 2012/0254074 A1* | 10/2012 | Flinn | G06F 16/951 706/4 |
| 2013/0204876 A1 | 8/2013 | Szucs et al. | |

(Continued)

OTHER PUBLICATIONS

Yerva et al., "Entity Disambiguation in Tweets Leveraging User Social Profiles," Information Reuse and Integration (IRI), 2013 IEEE 14th International Conference, pp. 1-9.

(Continued)

*Primary Examiner* — Dung K Chau

(74) *Attorney, Agent, or Firm* — Cuenot, Forsythe & Kim, LLC

(57) ABSTRACT

A computer-implemented method, computer program product, and computing system is provided for providing contextual information associated with a post in an activity stream. In an implementation, a method may include determining a need for contextual information relative to a post within an activity stream. The method may also include searching one or more contextual information sources relative to at least a portion of the post within the activity stream. The method may further include associating contextual information with the post within the activity stream.

20 Claims, 7 Drawing Sheets

(56) References Cited

U.S. PATENT DOCUMENTS

| | | | |
|---|---|---|---|
| 2014/0059185 A1 | 2/2014 | Siripurapu et al. | |
| 2014/0223099 A1* | 8/2014 | Kidron | G06F 12/0806 |
| | | | 711/118 |
| 2014/0298207 A1* | 10/2014 | Ittah | G06Q 10/00 |
| | | | 715/753 |
| 2014/0310037 A1* | 10/2014 | Griffin | G06Q 10/0631 |
| | | | 705/7.12 |
| 2014/0317734 A1* | 10/2014 | Valencia | G06F 21/316 |
| | | | 726/22 |
| 2014/0380191 A1 | 12/2014 | Rotbaein | |
| 2015/0023162 A1* | 1/2015 | Alisawi | H04W 28/0236 |
| | | | 370/230 |
| 2015/0067048 A1* | 3/2015 | Kannan | H04L 65/40 |
| | | | 709/204 |
| 2015/0121524 A1* | 4/2015 | Fawaz | G06F 21/552 |
| | | | 726/23 |
| 2015/0186774 A1 | 7/2015 | Albouyeh et al. | |
| 2015/0213145 A1* | 7/2015 | Baldwin | G06F 16/972 |
| | | | 715/234 |
| 2015/0286820 A1* | 10/2015 | Sridhara | G06F 21/566 |
| | | | 726/23 |
| 2015/0358757 A1 | 12/2015 | Ford et al. | |

OTHER PUBLICATIONS

IBM, Applendix P, Documents to be Treated as Related, pp. 1-2; filed Nov. 8, 2018.

\* cited by examiner

PROVIDING CONTEXT IN ACTIVITY STREAMS

RELATED APPLICATIONS

The subject application is a continuation application of U.S. patent application with Ser. No. 14/640,374, filed on Mar. 6, 3015, which is a continuation application of U.S. patent application with Ser. No. 14/446,785, filed on Jul. 30, 2014, the entire contents of which are herein incorporated by reference.

TECHNICAL FIELD

The present disclosure generally relates to systems and method for electronic collaboration, and more particularly relates to providing context for content within a collaboration system.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, exchange and share content, such as ideas, thoughts, or creations, and participate in interactive discussions using group messaging systems, blogs, forums, wikis, and social networking applications; engage in common work projects, for example, using online team work spaces, and engage in meetings, for example, using electronic meeting systems that allow for presentations, lectures, seminars, and the like.

SUMMARY OF DISCLOSURE

According to an implementation, a computer-implemented method may include determining a need for contextual information relative to a post within an activity stream. The method may also include searching one or more contextual information sources relative to at least a portion of the post within the activity stream. The method may further include associating contextual information with the post within the activity stream.

One or more of the following features may be included. Determining the need for contextual information may be based upon, at least in part, a natural language processing of the post within the activity stream. Determining the need for contextual information may be based upon, at least in part, one or more characteristics associated with a reader/consumer of the post within the activity stream.

Searching one or more contextual information sources may include searching one or more prior posts within the activity stream. Associating the contextual information with the post within the activity stream may include associating an older post from the activity stream with the post being read. Associating the contextual information with the post within the activity stream may include displaying the contextual information with the post in the activity stream. Associating the contextual information with the post within the activity stream may include providing a link to the contextual information.

According to another implementation, a computer program product may include a computer readable storage medium having a plurality of instructions stored on it. When executed by a processor, the instructions may cause the processor to perform operations including determining a need for contextual information relative to a post within an activity stream. Instructions may also be included for searching one or more contextual information sources relative to at least a portion of the post within the activity stream. Instructions may further be included for associating contextual information with the post within the activity stream.

One or more of the following features may be included. Determining the need for contextual information may be based upon, at least in part, a natural language processing of the post within the activity stream. Determining the need for contextual information may be based upon, at least in part, one or more characteristics associated with a reader/consumer of the post within the activity stream.

The instructions for searching one or more contextual information sources may include instructions for searching one or more prior posts within the activity stream. The instructions for associating the contextual information with the post within the activity stream may include instructions for associating an older post from the activity stream with the post being read. The instructions for associating the contextual information with the post within the activity stream may include instructions for displaying the contextual information with the post in the activity stream. The instructions for associating the contextual information with the post within the activity stream may include instructions for providing a link to the contextual information.

According to yet another implementation, a computing system may include a processor and a memory module coupled with the processor. The processor may be configured for determining a need for contextual information relative to a post within an activity stream. The processor may also be configured for searching one or more contextual information sources relative to at least a portion of the post within the activity stream. The processor may further be configured for associating contextual information with the post within the activity stream.

One or more of the following features may be included. Determining the need for contextual information may be based upon, at least in part, a natural language processing of the post within the activity stream. Determining the need for contextual information may be based upon, at least in part, one or more characteristics associated with a reader/consumer of the post within the activity stream. The processor configured for searching one or more contextual information sources may be further configured for searching one or more prior posts within the activity stream.

The processor configured for associating the contextual information with the post within the activity stream may be further configured for associating an older post from the activity stream with the post being read. The processor configured for associating the contextual information with the post within the activity stream may be further configured for displaying the contextual information with the post in the activity stream.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
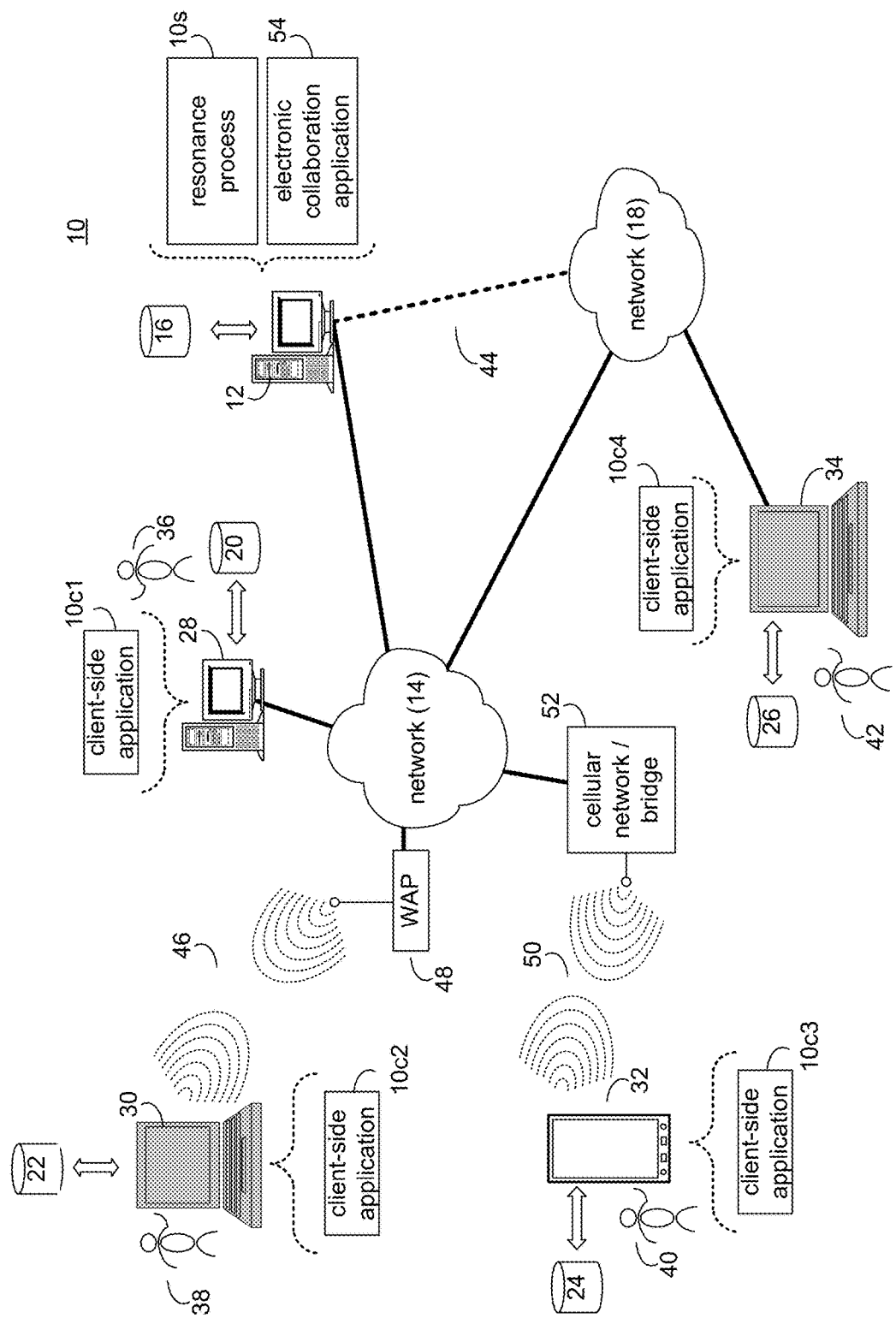
FIG. 1 is a diagrammatic view of a distributed computing network including a computing device that executes a context process according to an implementation of the present disclosure.

Individuals may often engage in collaboration sessions, utilizing a data network for sharing content with one another. Consistent with some embodiments of the present disclosure, users may engage in collaboration sessions, such participating in interactive discussions or the like. For example, users may create and share content, such as their thoughts, opinions, ideas, and creations, with one another using a variety of collaboration systems. Some collaboration systems may allow users to post content to a shared space, or otherwise transmit content to other participants of a collaboration session. Examples of collaboration environments utilized in connection with some embodiments of the present disclosure may include forums (such as internet forums or privately hosted forums), wikis, blogs, instant messaging chats, social networking application (e.g., in which users may post content to a common page, site, or system for dissemination to others), shared team spaces, and the like. In some implementations, content posted by participants in a collaboration session may be shared with other participants in the collaboration session in real time and/or in near real time. As such, participants in a collaboration session may participate in interactive discussion, share content (such as posts, images, creative works, etc.), engage in common projects, and the like.

In some situations, an individual reading, or otherwise consuming, posts or content from an activity feed, or other collaborative environment, may not fully understand the content. This lack of understanding may arise, for example, from the individuals general unfamiliarity with the subject matter of the content, or from a lack of perceived continuity in the content stream. For example, a post to an activity stream may relate to, or build on, an earlier post to the activity stream. Without knowledge of the earlier post it may be difficult to fully understand a current post. A time separation or the presence of intervening content (e.g., other posts relating to different topics or not providing sufficient information) may make it difficult or time consuming for the individual to identify the earlier post. Therefore, the situation may arise in which the individual is not capable of fully and/or correctly understanding the current post.

In an embodiment consistent with the present disclosure, information may be provided to an individual consuming content from a collaborative environment to assist the individual understanding the meaning and/or nature of the content being consumed. For example, the information may provide context to the content being consumed, which may aid in the individual's understanding of the content. In some embodiments, the need for contextual information may be determined relative to a post within an activity stream (i.e., a post within a collaborative environment). One or more sources of contextual information may be searched relative to at least a portion of the post within the activity steam, and contextual information may be associated with the post. The contextual information associated with the post may, for example, assist a consumer of the post in understanding the information included in the post.

In some embodiments, the need for contextual information may be based upon, at least in part, monitoring one or more background and/or foreground applications associated with the individual reading the post. For example, applications running in either background or the foreground on a computing device that the individual is using to consume the post may be monitored. Based upon, at least in part, the identity of the applications (e.g., code editor, web browser, word processor, etc.) or content associated with the applications (e.g., content rendered on a web browser, documents accessed via a word processor, etc.,), it may be determined that the individual may require additional information relating to the post. For example, the individual may be accessing one or more websites including keywords from the post. In some embodiments, natural language processing of content of the post may indicate that additional information may be useful to aid the individual in understanding the post.

In some embodiments, the additional information may be displayed relative to the post being consumed by the individual to conveniently allow the individual to access the additional information. For example, the additional information may include another post from the collaborative environment (such as another post and/or an earlier post from an activity stream). In an embodiment, the other post(s) from the collaborative environment may be displayed in a threaded relationship relative to the post being consumed. The threaded relationship may, for example, not only allow the individual to have access to the information from the other post, but the threaded relationship may also allow the individual to understand the relationship between the post being consumed and the additional information (e.g., the other post(s) from the activity stream). In some embodiments, the additional information may be provided, for example, as a pop-up or other display. The pop-up or other display may be activated, for example, in response to the individual selecting or hovering-over an option for additional information, or the like. Various additional and/or alternative implementations are contemplated.

Referring to FIG. 1, there is shown context process 10. For the following discussion, it is intended to be understood that context process 10 may be implemented in a variety of ways. For example, context process 10 may be implemented as a server-side process, a client-side process, or a server-side/client-side process.

For example, context process 10 may be implemented as a purely server-side process via context process 10s. Alternatively, context process 10 may be implemented as a purely client-side process via one or more of client-side application 10c1, client-side application 10c2, client-side application 10c3, and client-side application 10c4. Alternatively still, context process 10 may be implemented as a server-side/client-side process via server-side context process 10s in combination with one or more of client-side application 10c1, client-side application 10c2, client-side application 10c3, and client-side application 10c4. In such an example, at least a portion of the functionality of context process 10 may be performed by context process 10s and at least a portion of the functionality of context process 10 may be performed by one or more of client-side application 10c1, 10c2, 10c3, and 10c3.

Accordingly, context process 10 as used in this disclosure may include any combination of context process 10s, client-side application 10c1, client-side application 10c2, client-side application 10c3, and client-side application 10c4.

Figure 2:
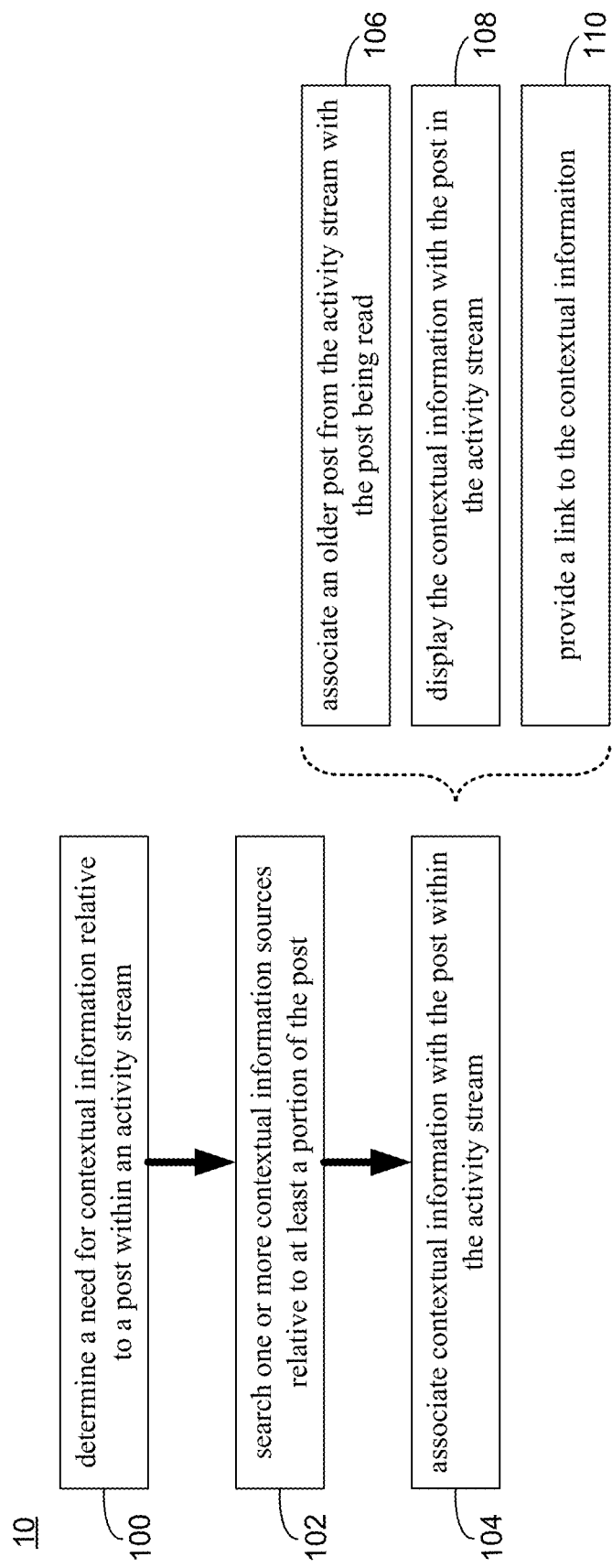
FIG. 2 is a flowchart of the context process of FIG. 1, according to an example implementation of the present disclosure.

Referring also to FIG. 2, and as will be discussed in greater detail below, context process 10 may determine 100 a need for contextual information relative to a post within an activity stream. Context process 10 may search 102 one or more contextual information sources relative to at least a portion of the post within the activity stream. Context process 10 may associate 104 contextual information with the post within the activity stream.

Context process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of context process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of an instant messaging application, a social networking application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access context process 10 directly through network 14 or through secondary network 18. Further, context process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, context process 10 may communicate with, interact with, and/or include a component or module of a collaboration application (e.g., collaboration application 54). As is generally known, a collaboration application (e.g., collaboration application 54) may generally facilitate text, graphical, multi-media, audio, and/or video collaboration between individuals as participants in a collaboration session. Examples of collaboration application 54 may include, but are not limited to, instant messaging applications, an electronic meeting application, applications that support forums for user posted content, wikis, social networking applications, team rooms, and the like. For example, collaboration application 54 may allow multiple users to post content (such as text-based content, graphical content, etc.) for consumption by other participants in the collaboration session. In some embodiments, collaboration application 54 may allow for real time, or near-real time, publication of content by participants in a collaboration session. For example, users of collaboration application 54 may create posts which may be published to a page, space, or site for consumption by other users. In some embodiments, a communication session may only include two participants. In some embodiments, a communication session may include more than two participants.

In an embodiment, the instruction sets and subroutines of electronic collaboration application 54 may be stored, e.g., on storage device 16 associated with server computer 12, which executes electronic collaboration application 54, and/or another suitable storage device. Further, users (e.g., one or more of users 36, 38, 40, 42) may access electronic collaboration application 54 in order to participate in a collaboration session (such as a group messaging session; an exchange of postings to a forum, wiki, or social networking page or site; or the like). The users may access electronic collaboration application 54 via one or more suitable applications, such as client side applications 10c1-10c4 (e.g., which may include an instant messaging application, a web browser, a client electronic meeting application, or another application) and/or via a different application (not shown).

As generally discussed above, a portion and/or all of the functionality of context process 10 may be provided by one or more of client side applications 10c1-10c4. For example, in some embodiments context process 10 (and/or client-side functionality of context process 10) may be included within and/or interactive with client-side applications 10c1-10c4, which may include client side electronic collaboration applications, web browsers, or another application. In other embodiments, a portion and/or all of the functionality of context process may be provided by electronic collaboration application 54, and/or another server-side application. Various additional/alternative configurations may be equally utilized.

As generally discussed above with reference to FIG. 2, context process 10 may determine 100 a need for contextual information relative to a post within an activity stream. Context process 10 may search 102 one or more contextual information sources relative to at least a portion of the post within the activity stream. Context process 10 may associate 104 contextual information with the post within the activity stream.

Figure 3:
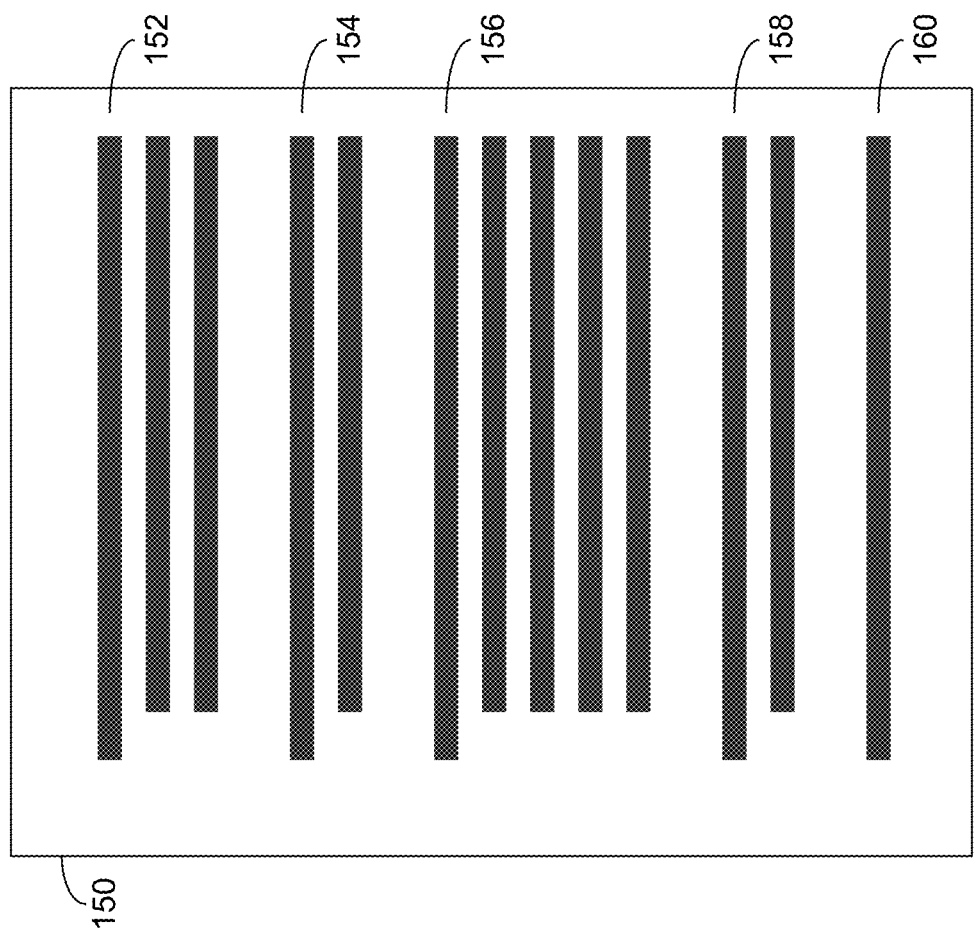
FIG. 3 schematically depicts an implementation of the context process of FIG. 1, according to an example implementation of the present disclosure.

For example, and referring also to FIG. 3, a user (e.g., user 36) may access content within a collaboration environment. As generally discussed above, examples of collaboration environments utilized in connection with some embodiments of the present disclosure may include forums (such as internet forums or privately hosted forums), wikis, blogs, instant messaging chats, social networking application (e.g., in which users may post content to a common page, site, or system for dissemination to others), shared team spaces, and the like. For the purpose of illustration, user 36 may access a collaboration environment including activity stream 150, which may include a plurality of posts (e.g., posts 152, 154, 156, 158, 160) by one or more users. It will be appreciated that different collaboration environments may include activity streams and/or content having different structures and arrangements.

According to different implementations, the content within activity steam 150 (e.g., posts 152, 154, 156, 158, 160) may include content that is created by one user, or by more than user, of activity steam 150. Further, posts 152, 154, 156, 158, 160 may generally relate to a single topic or unifying concept, or may pertain to any number of different topics or subjects. In connection with user 36 reading a post (such as post 156) and/or otherwise consuming content of activity stream 150 (e.g., which may include non-text based content, such as multimedia content, or the like), context process 10 may determine 100 a need for contextual information relative to a post within an activity stream.

In an embodiment, context process 10 may determine 100 the need for contextual information relative to post 156 based upon, at least in part, a natural language processing of post 156 within activity stream 150. For example, via natural language processing of post 156 context process 10 may determine possible ambiguities associated with post 156. Possible ambiguities may include, but are not limited to, ambiguous language, esoteric terms, terms of art, or the like. For example, post 156 may read "That went very well. Everyone was happy with the outcome. This is going to be a big deal." The use of the pronouns "that," "everyone," "this," as well as other language in post 156 may be determined to be ambiguous via the natural language processing. Based on the possible ambiguous language, context process 10 may determine the need for contextual information relative to post 156. In some implementations, context process 10 and/or a natural language processing engine may access one or more repositories of potentially ambiguous terms, esoteric terms, and/or terms of art for determining 100 the need for contextual information relative to post 156.

In an embodiment, determining 100 the need for contextual information may be based upon, at least in part, one or more characteristics associated with a reader or consumer of the post within the activity stream. For example, and continuing with the above example, context process 10 may monitor one or more background applications and/or foreground applications associated with user 36 (e.g., one or background applications and/or foreground applications running on computing device 28 that is associated with and/or utilized by user 36). For example, if upon reading post 156 user 36 utilizes a web browser (or other application) to execute a search relative to one or more terms or topics included within post 156, context process 10 may determine the need for contextual information relative to post 156. In a related manner, if post 156 pertains to software development in the Java programming language and one or more instances of Java software development tools are running on computing device 28 (which may be associated with user 36), context process 10 may not determine the need for contextual information, e.g., based upon an assumed knowledge of the Java programming language for user 36. In addition/as an alternative to background and/or foreground applications running on a computing device associated with user 36, user 36's knowledge may be inferred from user activities, such as websites or documents accessed by the user, other posts or activity streams accessed by the user, user information included within a corporate, or other directory, or a user profile associated with a directory and/or a website, such as a social networking website, or the like.

In some embodiments, determining 100 the need for contextual information may be based upon, at least in part, one or more activity stream characteristics and/or one or more characteristics associated with an individual post. For example, in an embodiment contextual information may only be available for post and/or activity streams having a predetermined degree of recency. For example, context process 10 may only determine 100 the need for contextual information for posts (and/or activity streams) that were created within a predetermined time frame. Additionally/alternatively, context process 10 may only determine 100 the need for contextual information for posts (and/or activity streams) that were created prior to a predetermined time period. In some embodiments, context process 10 may determine 100 the need for contextual information based upon a topical characteristic of an activity stream and/or of a post within an activity stream. For example, in some embodiments contextual information may only be available for certain activity streams and/or for posts within activity streams that relate to certain topics. Determining 100 the need for contextual information may be based upon, at least in part, various additional and/or alternative activity stream and/or post characteristics or attributes. One or more of the following post and/or activity stream characteristics and/or attributes may be defined based upon, at least in part, characteristics defined by a user, such as an administrator, rules associated with context process 10, and/or other design considerations.

Context process 10 may search 102 one or more contextual information sources relative to at least a portion of the post within the activity stream. For example, in response to determining 100 the need for contextual information associated with an activity stream and/or associated with a post within an activity stream, context process 10 may search 102 one or more contextual information sources relative to at least a portion of the post within the activity stream for appropriate contextual information. For example, context process 10 may utilize natural language processing, and/or other suitable techniques, to identify key words, key phrases, topical information, or the like within the post. Accordingly, context process 10 may search 102 the one or more contextual information sources based upon, at least in part, an identified key work, key phrase, piece of topical information, or the like to identify suitable contextual information.

In an embodiment, searching 102 one or more contextual information sources may include searching one or more prior posts within the activity stream. For example, in an embodiment context process 10 may search 102 back through the activity stream to identify contextual information that may be beneficial to the understanding the post that is currently being read by a user. That is, context process 10 may search prior posts within that activity stream to identify one or more other posts that may be relevant to the current post and/or to a point of ambiguity or a topic of the current post. Searching 102 one or more prior posts within the activity stream may include utilizing natural language processing to identify prior posts, and/or portions of prior posts, that may be relevant to the current post. In some embodiments, searching 102 one or more prior post within the activity stream may include searching one or more prior posts created by the same users who created the current post.

In addition/as an alternative to searching one or more prior posts within the activity stream, context process 10 may search 102 one or more other contextual information sources. For example, context process 10 may search one or more contextual information sources that may be relevant to an identified point of ambiguity and/or a relevant topic within the current post being read by the user. As such, the contextual information sources searched 102 by context process 10 may vary, for example, based upon the topic of the current post, a point of ambiguity within the current post, or the like. In some embodiments, the sources of contextual information may be designated by the user reading the current post, by an administrator (e.g., of context process 10, of the electronic collaboration application, or the like). Various additional and/or alternative manners of designating sources of contextual information may be utilized. In some embodiments, the sources of contextual information may include specific web pages or resource documents, wikis, team rooms, shared collaborative spaces, or the like.

Context process 10 may associate 104 contextual information with the post within the activity stream. For example, context process 10 may associate the contextual information with the post in a manner that may allow a reader of the post to read, or otherwise access, the contextual information to facilitate improved understanding of the post by the reader. For example, and referring also to FIG. 4, in an embodiment, associating 104 the contextual information with the post within the activity stream may include associating 106 an older post from the activity stream with the post being read. For example, the contextual information may include an earlier post (and/or a portion of an earlier post) within activity stream 150. In such an embodiment, earlier post 162 (and/or a portion of an the earlier post) may be associated 106 with post 156, which is currently being read by user 36 to thereby facilitate user 36 understanding post 156. Referring to the earlier example in which post 156 may read "That went very well. Everyone was happy with the outcome. This is going to be a big deal." User 36 may not have sufficient context to understand post 156. However, earlier post 162 may indicate that the author of the post is "Leaving to meet with John and Susan from ABC Corp. This is a big pitch, and could mean a lot of business if I can land it." The context provided by earlier post 162 may allow user 36 to understand that the meeting with John and Susan went well, and that the successful pitch could lead to "a lot of business" from ABC Corp.

Figure 4:
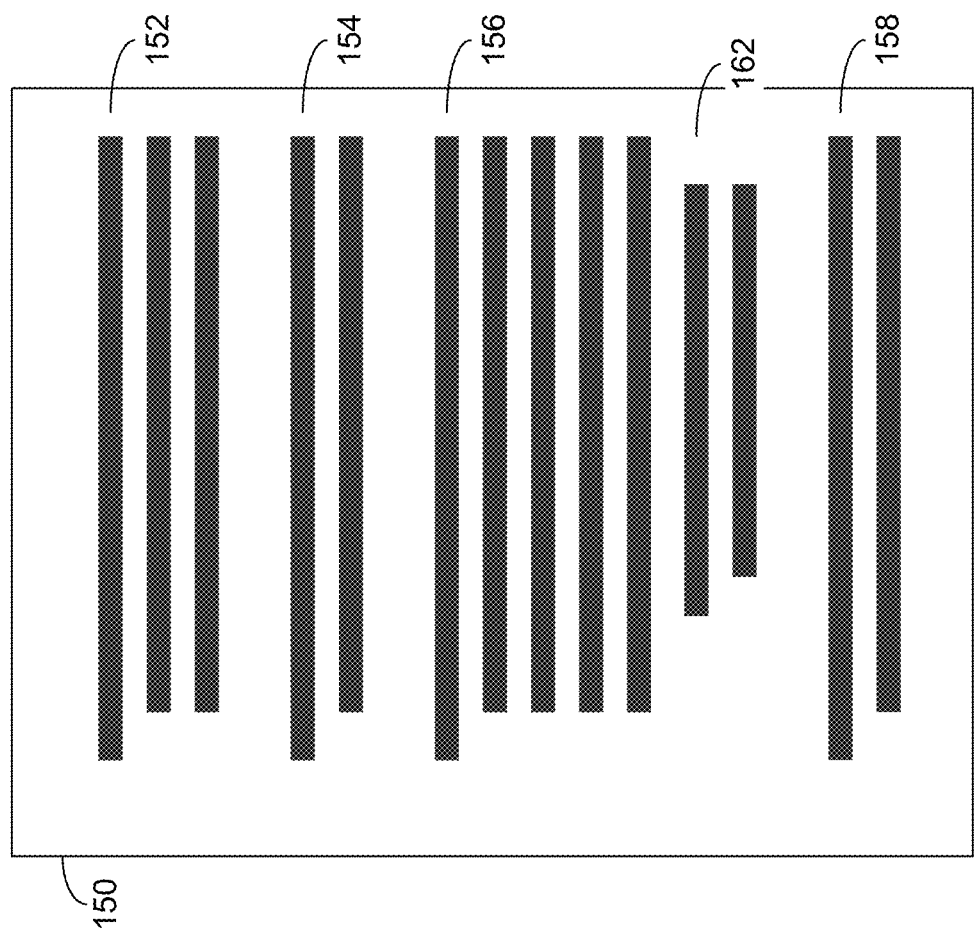
FIG. 4 schematically depicts an implementation of the context process of FIG. 1, according to an example implementation of the present disclosure.

As shown in FIG. 4, in an embodiment, earlier post 162 may be associated 106 with post 156 by displaying post 162 together with post 156. For example, in the illustrated embodiment, post 156 and post 162 may be displayed in a threaded view. Such a threaded view may be provided by context process 10, for example, even in a situation in which activity stream 150 may not generally provided threaded post views and/or in situations in which there may be intervening posts and or topic changes within activity stream 150 during the time between when post 161 and post 156 where published to activity stream 150.

Figure 5:
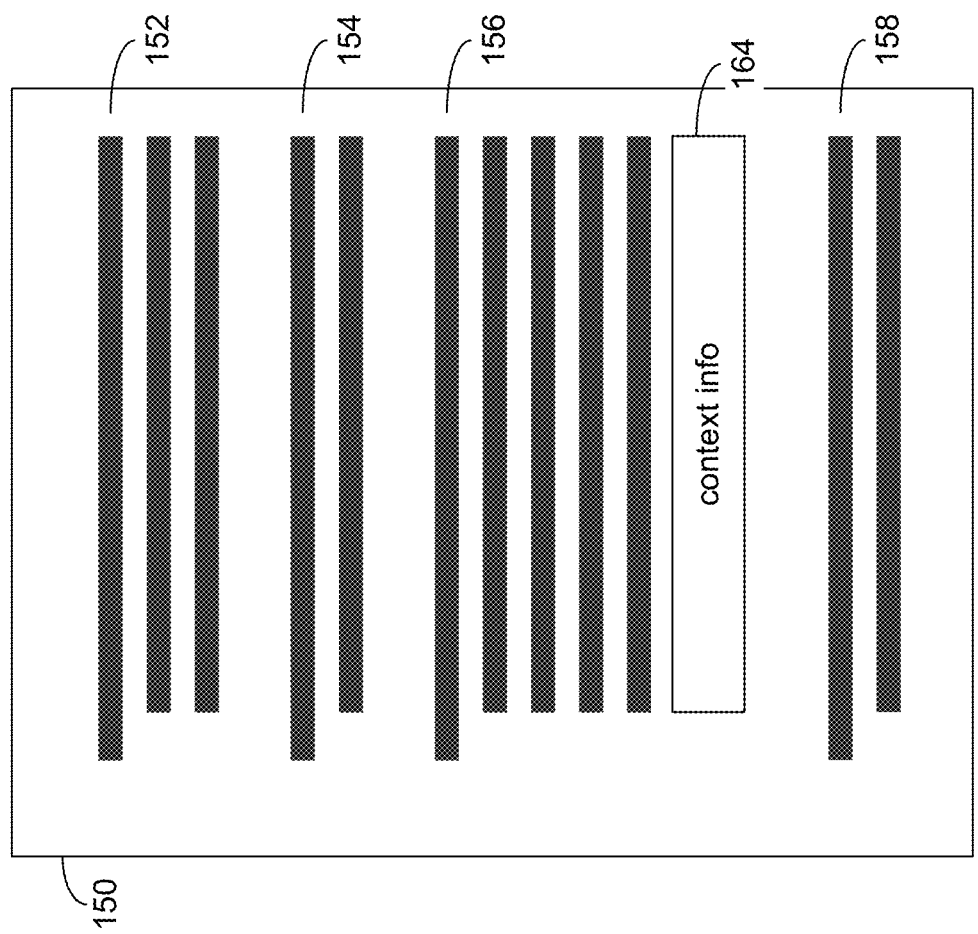
FIG. 5 schematically depicts an implementation of the context process of FIG. 1, according to an example implementation of the present disclosure.

In some embodiments, context process 10 may associate 104 the contextual information with the post within the activity stream in various other manners. For example, associating 104 the contextual information with the post within the activity stream may include displaying 108 the contextual information with the post in the activity stream. For example, as shown in FIG. 5, contextual information 164 may be provided as a component within post 156, as a popup display, e.g., that may be separate from a main display of activity stream 150, and/or may otherwise be displayed with post 156 such that user 36 may access and/or consume contextual information 164.

Figure 6:
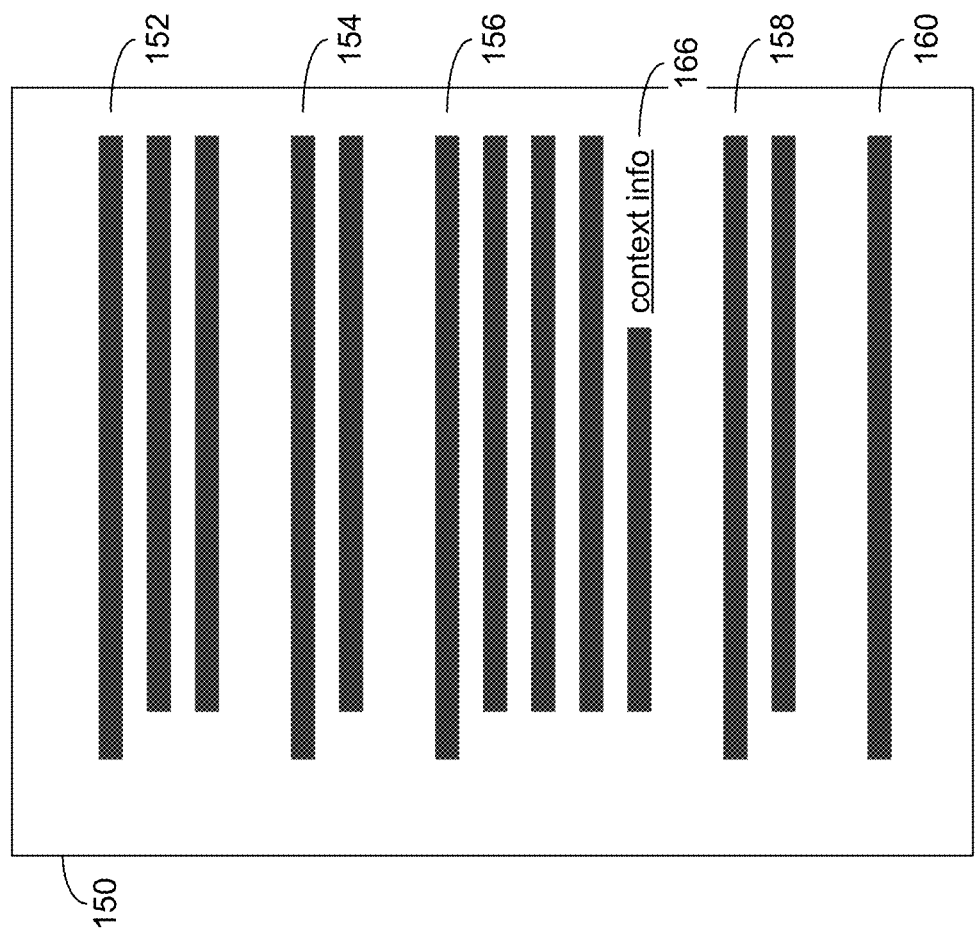
FIG. 6 schematically depicts an implementation of the context process of FIG. 1, according to an example implementation of the present disclosure.

According to an embodiment, and referring also to FIG. 6, associating 104 the contextual information with the post within the activity stream may include providing 110 a link to the contextual information. For example, as shown post 156 may include link 166 to the contextual information. As is generally known, link 166 may be selected (e.g., using an onscreen pointer or the like), which may cause context process 10 (alone and/or in conjunction with another process or application) to render the contextual information. In response to user 36 selecting link 166, the contextual information may be displayed within activity stream 150, within another window (e.g., within a popup window, within a window associated with a web browser or other application, or the like), and/or may otherwise provide access to the contextual information. For example, in an embodiment, link 166 may include a link to an earlier post within activity stream 150. In response to user 36 selecting link 166, the earlier post referenced by link 166 may be displayed within activity stream 150. Various additional and/or alternative embodiments, may be utilized.

As generally described above, in some embodiments content within an activity stream may be analyzed to determine if additional contextual information may likely be useful to assist a consumer of the activity stream in understanding a particular piece of content, such as a post within the activity stream. If it is determined that additional contextual information may be useful, one or more potential sources of contextual information may be searched relative to the content of the activity stream. Examples of sources of contextual information may include other content within the activity stream (such as earlier posts within the activity stream), wikis, forums, document repositories, shared collaborative spaces, or the like. The identified contextual information may be presented, for example, in associated with the content to be understood. For example, the contextual information may be provided in a threaded view of posts within the activity stream, as embedded content (e.g., within a post include in the activity stream), as a popup, as a link, and/or may be otherwise provided. As such, in some situations the additional contextual information may allow a consumer of content from the activity stream to achieve a better understanding of the content.

Figure 7:
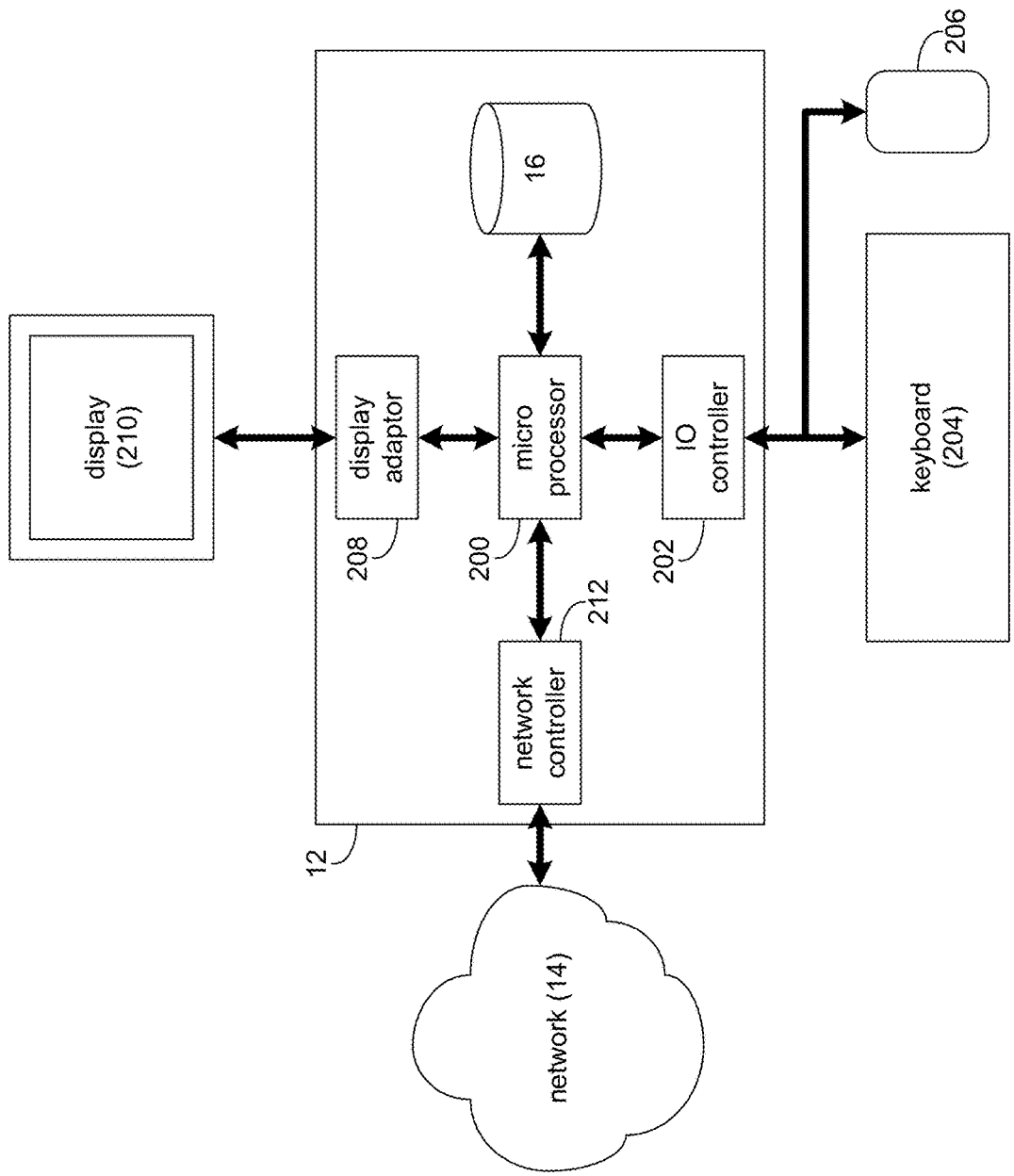
FIG. 7 schematically depicts an example of a computing device that may implement the context process of FIG. 1, according to an example embodiment of the present disclosure.

Referring also to FIG. 7, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of context process 10 may be substituted for computing device 12 within FIG. 7, examples of which may include but are not limited to client electronic devices 28, 30, 32, 34.

Computing system 12 may include microprocessor 200 configured to e.g., process data and execute instructions/code for context process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   determining a need for contextual information relative to a post within an activity stream based upon, at least in part, the user's knowledge of a topic of the post inferred from at least one user activity;
   searching one or more contextual information sources relative to at least a portion of the post within the activity stream; and
   associating contextual information with the post within the activity stream.

2. The method of claim 1, wherein determining the need for contextual information is based upon, at least in part, a natural language processing of the post within the activity stream.

3. The method of claim 1, wherein determining the need for contextual information is based upon, at least in part, one or more characteristics associated with a consumer of the post within the activity stream.

4. The method of claim 1, wherein searching one or more contextual information sources includes searching one or more prior posts within the activity stream.

5. The method of claim 1, wherein associating the contextual information with the post within the activity stream includes associating an older post from the activity stream with the post being read.

6. The method of claim 1, wherein associating the contextual information with the post within the activity stream includes displaying the contextual information with the post in the activity stream.

7. The method of claim 1, wherein associating the contextual information with the post within the activity stream includes providing a link to the contextual information.

8. A computer program product comprising a computer readable storage medium having a plurality of instructions stored thereon, which, when executed by a processor, cause the processor to perform operations including:
   determining a need for contextual information relative to a post within an activity stream based upon, at least in part, the user's knowledge of a topic of the post inferred from at least one user activity;
   searching one or more contextual information sources relative to at least a portion of the post within the activity stream; and
   associating contextual information with the post within the activity stream.

9. The computer program product of claim 8, wherein determining the need for contextual information is based upon, at least in part, a natural language processing of the post within the activity stream.

10. The computer program product of claim 8, wherein determining the need for contextual information is based upon, at least in part, one or more characteristics associated with a consumer of the post within the activity stream.

11. The computer program product of claim 8, wherein the instructions for searching one or more contextual information sources include instructions for searching one or more prior posts within the activity stream.

12. The computer program product of claim 8, wherein the instructions for associating the contextual information with the post within the activity stream include instructions for associating an older post from the activity stream with the post being read.

13. The computer program product of claim 8, wherein the instructions for associating the contextual information with the post within the activity stream include instructions for displaying the contextual information with the post in the activity stream.

14. The computer program product of claim 8, wherein the instructions for associating the contextual information with the post within the activity stream include instructions for providing a link to the contextual information.

15. A computing system comprising:
   a processor and a memory module coupled with the processor, the processor being configured for:
   determining a need for contextual information relative to a post within an activity stream based upon, at least in part, the user's knowledge of a topic of the post inferred from at least one user activity;
   searching one or more contextual information sources relative to at least a portion of the post within the activity stream; and
   associating contextual information with the post within the activity stream.

16. The computing system of claim 15, wherein determining the need for contextual information is based upon, at least in part, a natural language processing of the post within the activity stream.

17. The computing system of claim 15, wherein determining the need for contextual information is based upon, at least in part, one or more characteristics associated with a consumer of the post within the activity stream.

18. The computing system of claim 15, wherein the processor configured for searching one or more contextual information sources is further configured for searching one or more prior posts within the activity stream.

19. The computing system of claim 15, wherein the processor configured for associating the contextual information with the post within the activity stream is further configured for associating an older post from the activity stream with the post being read.

20. The computing system of claim 15, wherein the processor configured for associating the contextual information with the post within the activity stream is further configured for displaying the contextual information with the post in the activity stream.

\* \* \* \* \*